United States Patent
Mitomi et al.

(10) Patent No.: US 7,382,942 B2
(45) Date of Patent: Jun. 3, 2008

(54) OPTICAL WAVEGUIDE DEVICES

(75) Inventors: Osamu Mitomi, Nagoya (JP); Kenji Aoki, Ichinomiya (JP); Jungo Kondo, Nishikamo-Gun (JP); Yuichi Iwata, Nagoya (JP); Tetsuya Ejiri, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/557,506

(22) Filed: Nov. 8, 2006

(65) Prior Publication Data

US 2007/0104407 A1    May 10, 2007

(30) Foreign Application Priority Data

Nov. 10, 2005  (JP)  ............... 2005-325928

(51) Int. Cl.
*G02F 1/295*  (2006.01)
(52) U.S. Cl. .............. 385/2; 385/3; 385/8; 385/9; 385/14
(58) Field of Classification Search .......... 385/2–3, 385/8–9, 14
See application file for complete search history.

(56) References Cited

U.S. PATENT DOCUMENTS

| | | | |
|---|---|---|---|
| 6,470,125 B1 | 10/2002 | Nashimoto et al. | |
| 6,556,727 B2 | 4/2003 | Minakata et al. | |
| 7,212,326 B2* | 5/2007 | Wooten et al. | 359/245 |
| 2002/0048076 A1 | 4/2002 | Kondo et al. | |
| 2002/0126932 A1* | 9/2002 | Minakata et al. | 385/2 |
| 2004/0184755 A1 | 9/2004 | Sugiyama et al. | |

FOREIGN PATENT DOCUMENTS

| | | |
|---|---|---|
| EP | 0 938 000 | 8/1999 |
| JP | 04-355714 A1 | 12/1992 |
| JP | 09-211402 A1 | 8/1997 |
| JP | 2002-169133 A1 | 6/2002 |
| JP | 2004-341147 A1 | 12/2004 |

\* cited by examiner

*Primary Examiner*—Frank G. Font
*Assistant Examiner*—Michael P. Mooney
(74) *Attorney, Agent, or Firm*—Burr & Brown

(57) ABSTRACT

It is provided an optical waveguide device in which the radius of curvature of a curved part of an optical waveguide can be lowered and the radiation loss of light in the curved part can be reduced. An optical waveguide device 2 has a ferroelectric optical waveguide substrate and an optical waveguide 5 formed in or on the substrate and modulating electrodes 4A, 4B and 4C. The thickness of the optical waveguide substrate is 30 μm or smaller at least in a region where the optical waveguide is formed. The optical waveguide has curved part having a radius of curvature of 30 mm or smaller.

10 Claims, 12 Drawing Sheets

OPTICAL WAVEGUIDE DEVICES

This application claims the benefits of Japanese Patent Application P2005-325928 filed on Nov. 10, 2005, the entirety of which is incorporated by reference.

BACKGROUND OF THE INVENTION

1. Field of the Invention

The present invention relates to an optical waveguide device.

2. Related Art Statement

It is proposed a structure of lowering the thickness of an optical waveguide substrate to attain the velocity matching of microwave and light wave, so as to widen the modulation bandwidth of an optical modulator.

In such kind of a structure utilizing a thinner optical waveguide substrate, it is required to lower the thickness of the substrate around an optical waveguide to a value of, for example 10 μm, for satisfying the velocity matching condition. Such thin optical waveguide may result in the flattening of optical mode field pattern and transmission loss of light due to surface roughness and damage caused by the processing for producing the thin substrate and a groove. The assignee filed a Japanese Patent publication 2002-169133A disclosing two-step groove structure for preventing the flattening of optical mode field pattern and the transmission loss.

According to a device described in Japanese Patent publication H09-211402A, an air layer is provided in a reinforcing substrate to satisfy the velocity matching condition. Further, according to a device described in Japanese Patent publication 2004-341147A, a plate-shaped optical waveguide substrate having a thickness of 30 μm is bonded onto a reinforcing substrate to integrate them.

Further, Japanese Patent publication H04-355714A describes a traveling wave type optical modulator having a crossing part where two optical waveguide branches intersect each other. According to this type of optical modulator, the optical waveguide is folded at one edge of a substrate to lower the substrate length required for applying necessary intensity modulation.

SUMMARY OF THE INVENTION

It is preferred to make an optical waveguide bend at a smaller radius of curvature, for miniaturizing an optical waveguide device. As the optical waveguide is curved, however, an optical radiation loss is increased in the curved part of the optical waveguide. It has thus been difficult to lower the radius of curvature of the curved part of the optical waveguide.

Further, when two optical waveguide branches are intersected at a crossing part, the whole crossing angle of the crossing part can be lowered to miniaturize the size of the optical waveguide substrate in the direction of the width with respect to the crossing part. It is thus possible to provide a smaller optical device. In the case that the whole crossing angle at the crossing part is lowered, however, the insertion loss and cross talk at the crossing part are increased. It has been thus difficult to lower the whole crossing angle at the crossing part.

An object of the present invention is to provide an optical waveguide device in which the radius of curvature of a curved part of an optical waveguide can be lowered and the optical radiation loss in the curved part can be reduced.

Another object of the present invention is to provide an optical modulator having an optical waveguide with a crossing part, so that the whole crossing angle at the crossing part can be lowered and the insertion loss and cross talk at the crossing part can be reduced.

A first aspect of the present invention provides an optical waveguide device comprising an optical waveguide substrate having ferroelectricity and an optical waveguide formed in or on the optical waveguide substrate. The thickness of the optical waveguide substrate is 30 μm or smaller at least in a region where the optical waveguide is formed, and the optical waveguide has a curved part whose radius of curvature is 30 mm or smaller.

A second aspect the present invention provides an optical waveguide device comprising an optical waveguide substrate having ferroelectricity and an optical waveguide formed in or on the optical waveguide substrate. The thickness of the optical waveguide substrate is 30 μm or smaller at least in a region where the optical waveguide is formed, and the optical waveguide has a crossing part.

According to the first aspect of the present invention, the thickness of the optical waveguide substrate is 30 μm or smaller at least in a region of the optical waveguide, and the optical waveguide includes a curved part having a radius of curvature of 30 μm or smaller. That is, the optical waveguide substrate is made as thin as 30 μm or smaller so that the substrate is set on a medium of a low dielectric constant (the medium may be air). It is thus possible to confine light strongly in the optical waveguide to considerably reduce the radiation loss in the curved part. It is proved that the radiation loss can be reduced while the device can be miniaturized.

The radiation loss in the curved part can be considerably reduced, by making the thickness of the substrate to 30 μm or smaller in a region where the optical waveguide is formed. The thickness may preferably be 10 μm or smaller and more preferably be 8 μm or smaller. Although the lower limit of the thickness of the substrate in the region where the optical waveguide substrate is formed is not particularly limited, the thickness may preferably be 2 μm or larger on the viewpoint of the mechanical strength. When the radius of curvature exceeds 30 mm, the radiation loss can be made lower at a some degree even when the substrate is thick. The radius of curvature of the curved part is thus made 30 mm or smaller, on the viewpoint of the present invention.

According to the first aspect of the present invention, a recess may be formed in the outside of the curved part. More preferably, an additional recess may be further formed in the inside of the curved part. Although the shape of each recess is not particularly limited, the shape may preferably be of a groove. Further, although the depth of the recess is not particularly limited, the depth may preferably be 0.2 μm or larger and more preferably be 0.5 μm or larger, on the viewpoint of attaining strong confinement of light in the curved part. A groove of a relatively small depth provides sufficient effects in the case that the thickness of the substrate is small. The depth of the recess is not larger than the thickness of the substrate. If the depth of the recess is too large, the strength of the substrate is deteriorated. On the viewpoint, the depth of the recess may preferably be smaller than the substrate thickness by a value of 1 μm or larger.

According to the second aspect of the present invention, the thickness of the optical waveguide substrate at least in the region of the optical waveguide is 30 μm or smaller. It is thus possible to lower the whole crossing angle at the crossing part so that the insertion loss and cross-talk in the crossing part can be reduced.

The cross-talk and insertion loss in the crossing part can be considerably reduced, by making the thickness of the substrate in the region where the optical waveguide is formed to 30 μm or smaller. The substrate thickness may preferably be 10 μm or smaller and more preferably be 8 μm or smaller. Although the lower limit of the substrate thickness in the region with the optical waveguide formed is not particularly defined, the thickness may preferably be 2 μm or larger on the viewpoint of the mechanical strength.

Further, the whole crossing angle is not particularly defined. When the maximum value of the whole crossing angle exceeds 40°, however, the insertion loss and cross-talk becomes low to a some degree, even if the substrate is thin. On the viewpoint of the present invention, the whole crossing angle may preferably be 40° or smaller, more preferably be 20° or smaller and most preferably be 10° or smaller. Further, as the whole crossing angle becomes smaller, it becomes difficult to miniaturize the optical waveguide device. On the viewpoint of miniaturizing the optical waveguide device, the whole crossing angle may preferably be 10° or larger and more preferably be 15° or larger.

These and other objects, features and advantages of the invention will be appreciated upon reading of the following description of the invention when taken in conjunction with the attached drawings, with the understanding that some modifications, variations and changes of the same could be easily made by the skilled person in the art.

PREFERRED EMBODIMENTS OF THE INVENTION

According to the first and second aspects of the present invention, a layer of air or a low dielectric material may preferably be provided in the upper and lower sides of the optical waveguide substrate. The advantageous effects of the present invention thus become considerable. The low dielectric layer may preferably be an adhesive layer described later. When the optical waveguide substrate is directly integrated or joined with a supporting body, however, the supporting body may be made of the low dielectric material.

Figure 1:
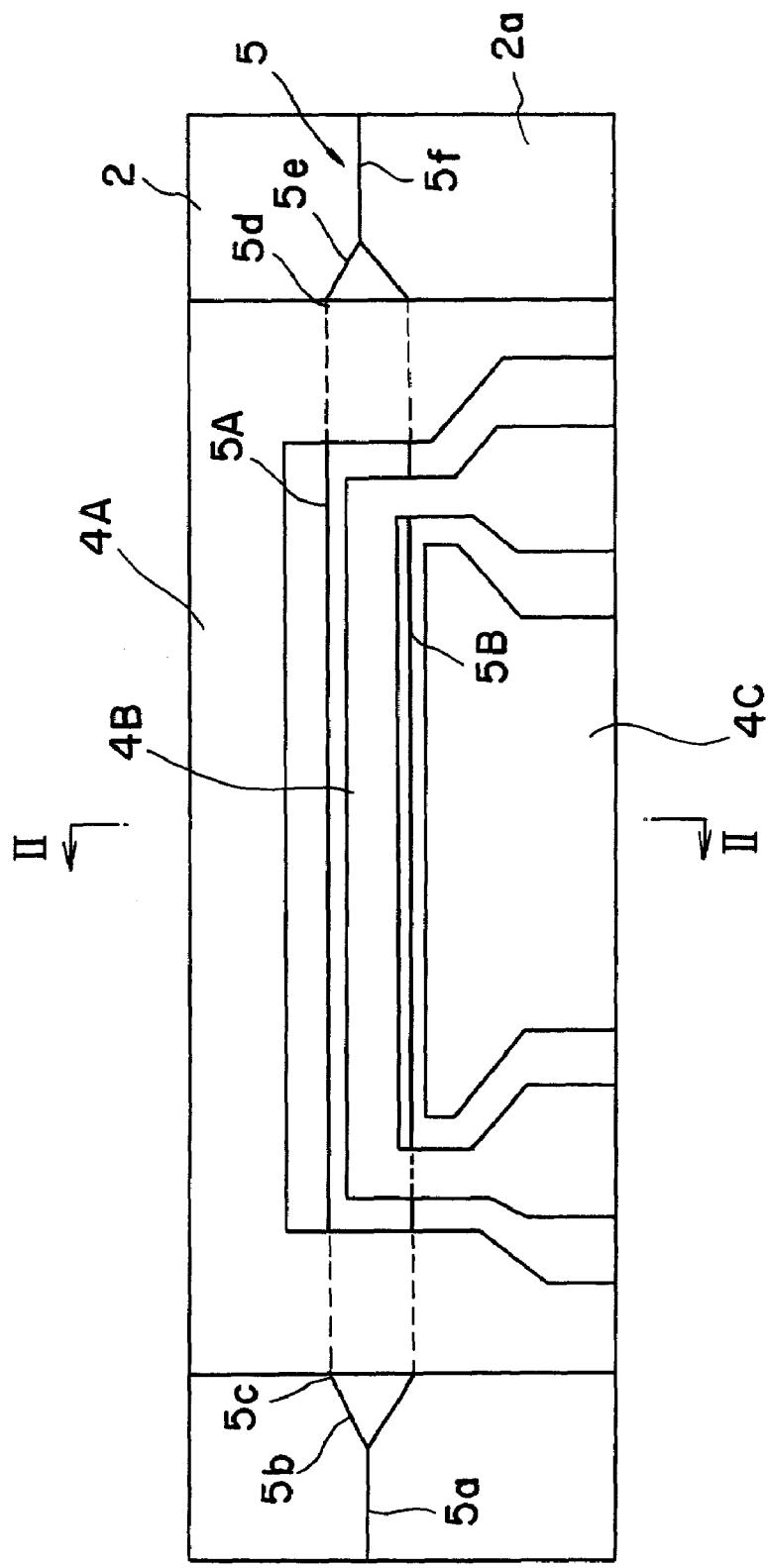
FIG. 1 is a plan view schematically showing an example of an optical modulator applicable in the present invention.
Figure 2:
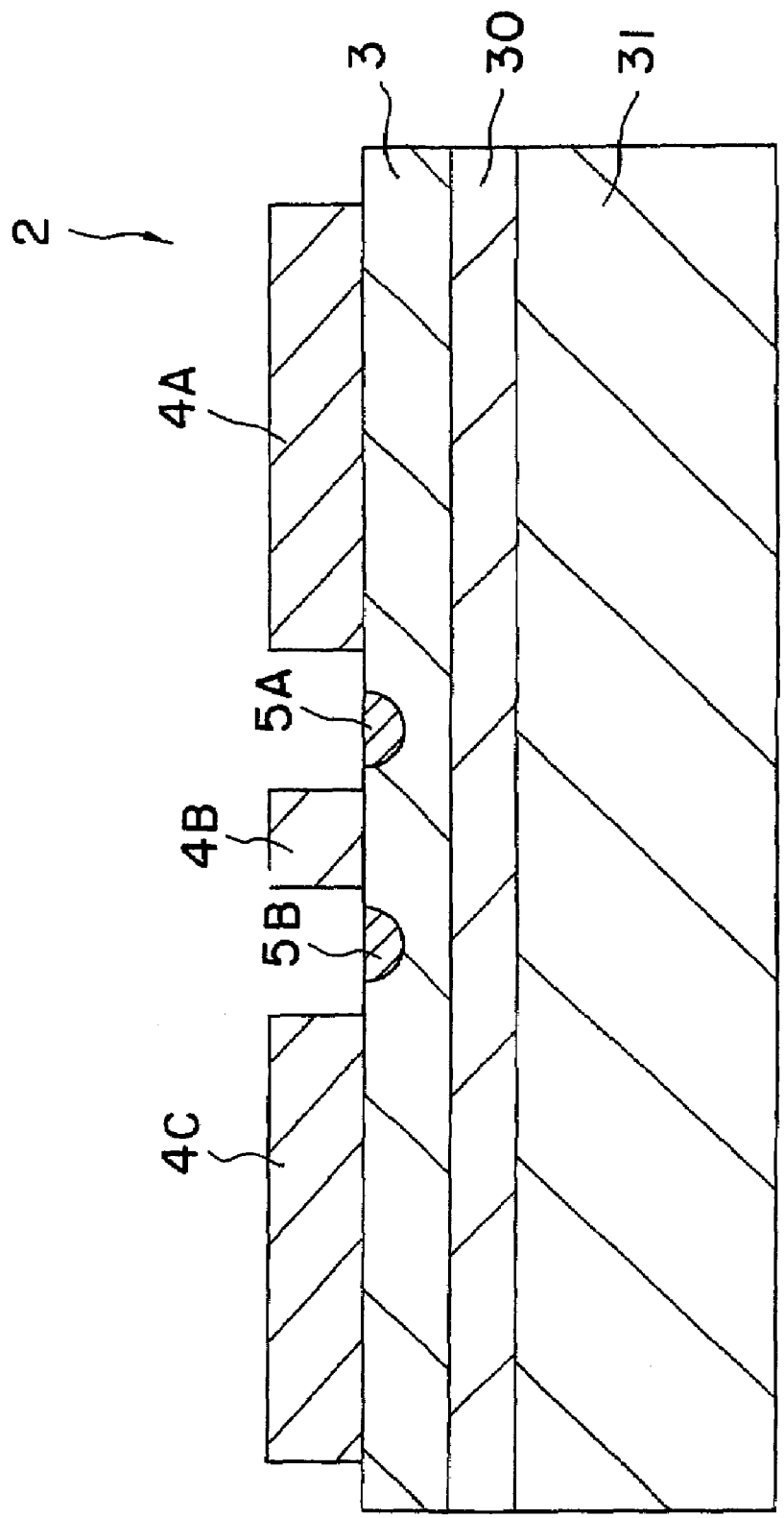
FIG. 2 is a cross sectional view showing the optical modulator 2 of FIG. 1.

FIG. 1 is a plan view showing an optical modulator 2, and FIG. 2 is a cross sectional view showing the optical modulator 2 of FIG. 1.

The optical modulator 2 has an optical waveguide substrate 3 and a supporting body 31. Both of the substrate 3 and supporting body 31 are flat-plate shaped. The substrate 3 has a thickness of 30 μm or smaller (in a region where the optical waveguide is formed). Predetermined electrodes 4A, 4B and 4C are formed on a main face of the substrate 3.

Although it is applied a so-called coplanar waveguide type electrode (CPW electrode) configuration according to the present example, the configuration of electrodes is not particularly limited. According to coplanar electrode configuration, a line of signal electrode is provided between a pair of ground electrodes. The present invention is, however, applicable to so-called ACPS type traveling wave optical modulator, for example. In this case, one line of ground electrode and one line of signal electrode are provided. It may be further applicable a traveling wave type optical modulator of, so-called, independent modulation type.

According to the present example, an optical waveguide 5 forms so-called Mach-Zehnder type waveguide in a plan view. That is, light is incident into an input part 5a of the optical waveguides 5, divided into two branched parts 5b and then incident into modulating parts 5A, 5B, respectively, through covered parts 5c. The light is then incident into branched parts 5e, respectively, through the corresponding curved parts 5d, coupled, and then outputted from an outputting part 5f. A signal voltage is applied onto a pair of the modulating parts 5A and 5B substantially in horizontal direction. An adhesive layer 30 having a substantially constant thickness is provided between the lower face of the substrate 3 and the supporting body 31 to adhere the substrate 3 onto the supporting body 31.

The optical waveguide may be a ridge type optical waveguide directly formed on one main face of the substrate, or a ridge type optical waveguide formed on another layer on the one main face of the substrate. Alternatively, the optical waveguide may be an optical waveguide formed by inner diffusion process such as titanium or zinc diffusion process, or an optical waveguide produced by ion exchange process such as proton exchange.

Specifically, the optical waveguide may be a ridge type optical waveguide protruding from the surface of the substrate. The ridge-type optical waveguide can be formed by laser or mechanical processing. Alternatively, a film of a high refractive index may be formed on the substrate and the film of the high refractive index may be subjected to mechanical or laser ablation processing to form a ridge-type channel optical waveguide. The film of a high refractive index may be formed by, for example, chemical vapor deposition, physical vapor deposition, metal organic chemical vapor deposition, sputtering or liquid phase epitaxial method.

Although the electrodes are formed on the surface of the substrate according to the present example, the electrodes may be directly formed on the one main face of the substrate, or may be formed on a buffer layer or a dielectric layer on the main face of the substrate.

The low dielectric layer made of a known material such as silicon oxide, magnesium fluoride, silicon nitride or alumina. The term "low dielectric layer" means a layer composed of a material having a dielectric constant lower than that of a material forming the substrate.

The thickness of the adhesive layer 30 may preferably be 1000 μm or smaller, more preferably be 300 μm or smaller and most preferably be 100 μm or smaller. Further, the lower limit of the adhesive layer 30 is not particularly limited and may be 10 μm or larger on the viewpoint of lowering the effective refractive index of microwave.

The optical waveguide substrate 3 and supporting body 31 are made of an electro-optic material having ferroelectricity and may preferably be made of a single crystal. Such crystal is not particularly limited as far as it is effective for light modulation, and includes lithium niobate, lithium tantalate, lithium niobate-lithium tantalate solid solution, potassium lithium niobate, KTP, GaAs and quartz.

The material of the supporting body 31 may be a glass such as quartz glass, in addition to the electro-optic materials described above.

The kind of such adhesive agent is not particularly limited as far as it satisfies the aforementioned conditions. The adhesive includes an epoxy resin adhesive, a thermal setting resin type adhesive, an ultraviolet curable resin adhesive, and a ceramic adhesive having a thermal expansion coefficient near that of the electro-optic material such as lithium niobate, for example "ALON CERAMICS C" (manufactured by To a Gosei Co., Ltd.: a thermal expansion coefficient of $13 \times 10^{-6}$/K).

Further, a space may be formed in the adhesive layer to form an air layer. Alternatively, a recess may be formed on the upper face (surface facing the optical waveguide substrate) of the adhesive layer 30 so that the recess is used as an air layer. In these cases, both the adhesive layer and air layer together function as the low dielectric layer.

Figure 3:
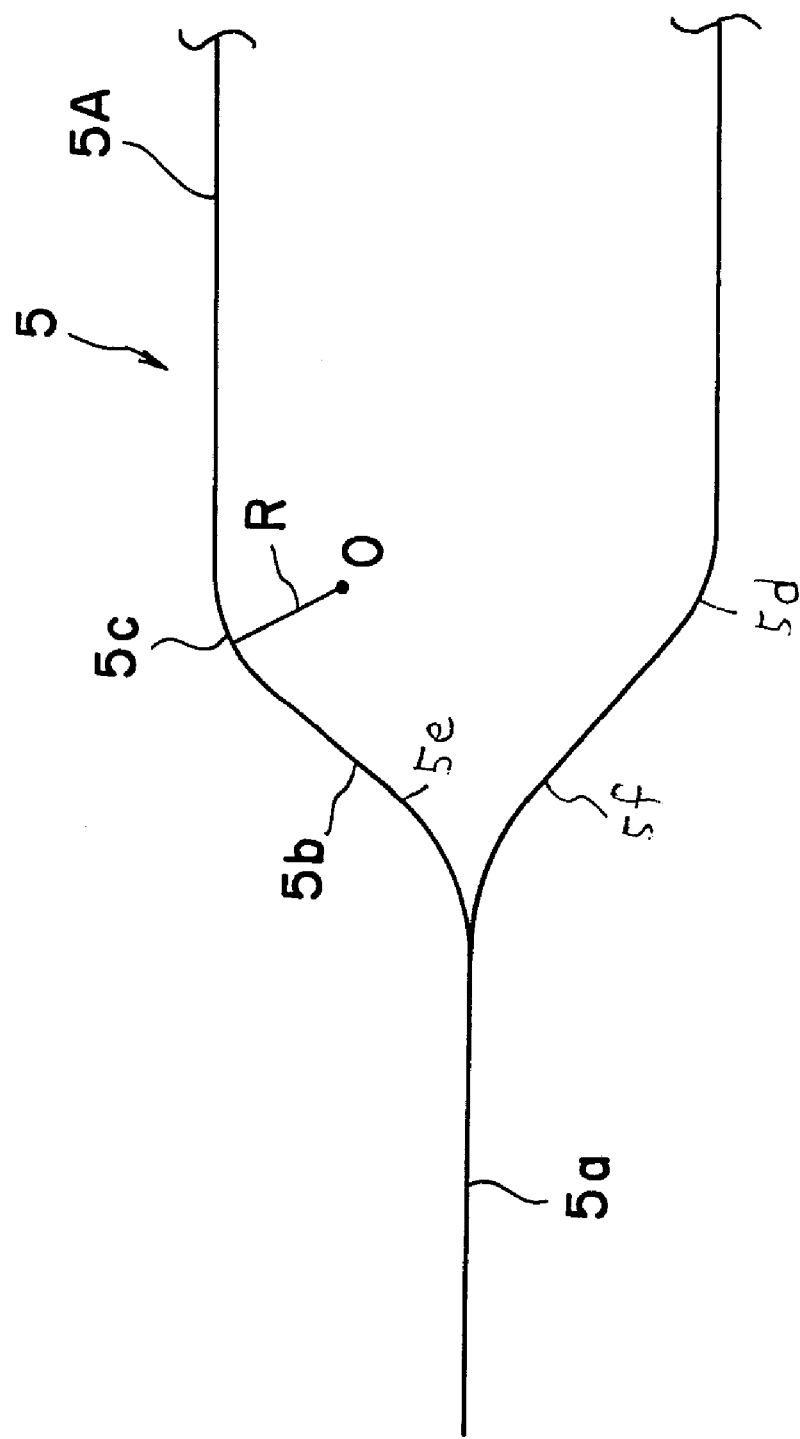
FIG. 3 is a plan view showing a pattern of an optical waveguide according to the first aspect of the present invention.

According to the first aspect of the present invention, as shown in FIG. 3, the radius of curvature "R" of the curved part 5c is made 30 mm or smaller. Similarly, the radius of curvature "R" of the curved part 5d is also made 30 mm or smaller. Further, each of the curved parts 5d and 5f is bent in a direction opposing that of the curved part 5c, 5d. The radius of curvature of each of the curved parts 5e and 5f is also made 30 mm or smaller. More preferably, the radii "R" of curvature of the curved parts are made 30 mm or smaller over the whole of the optical waveguides.

Figure 4:
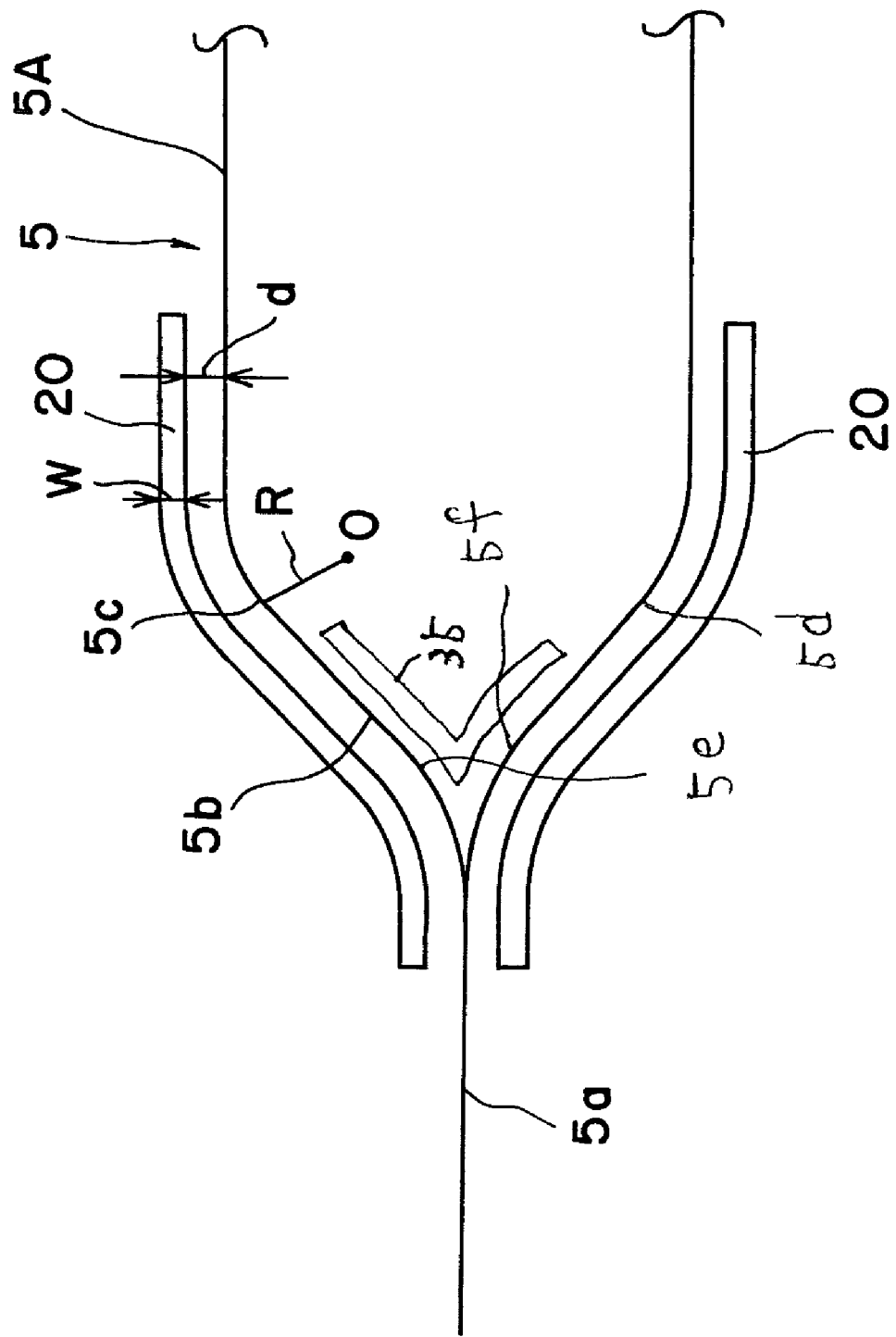
FIG. 4 is a plan view showing a pattern of an optical waveguide where a groove 20 is formed in the outside of the optical waveguide.

Further, according to an example shown in FIG. 4, an elongate recess 20 is formed in the outside of the branched part 5b, curved part 5c and the end of the modulating part 5A of the optical waveguide 5. The radius "R" of curvature of the curved part 5c is 30 mm or smaller. At the same time, an elongate part 20 is provided in the outside of the curved part 5d and the radius "R" of curvature of the curved part 5d is made 30 mm or smaller. A recess is not formed in the inside of the curved part 5c or 5d. At the same time, an elongate recess 35 is formed outside with respect to the center of curvature of each of the curved parts 5e and 5f. A recess is not formed in the inside of each of the curved parts 5e and 5f with respect to the center of curvature. The radius of curvature "R" of each of the curved parts 5e and 5f is 30 mm or smaller. More preferably, the radii of curvature of the curved parts are made 30 mm or smaller over the whole length of the optical waveguide 5.

Figure 5:
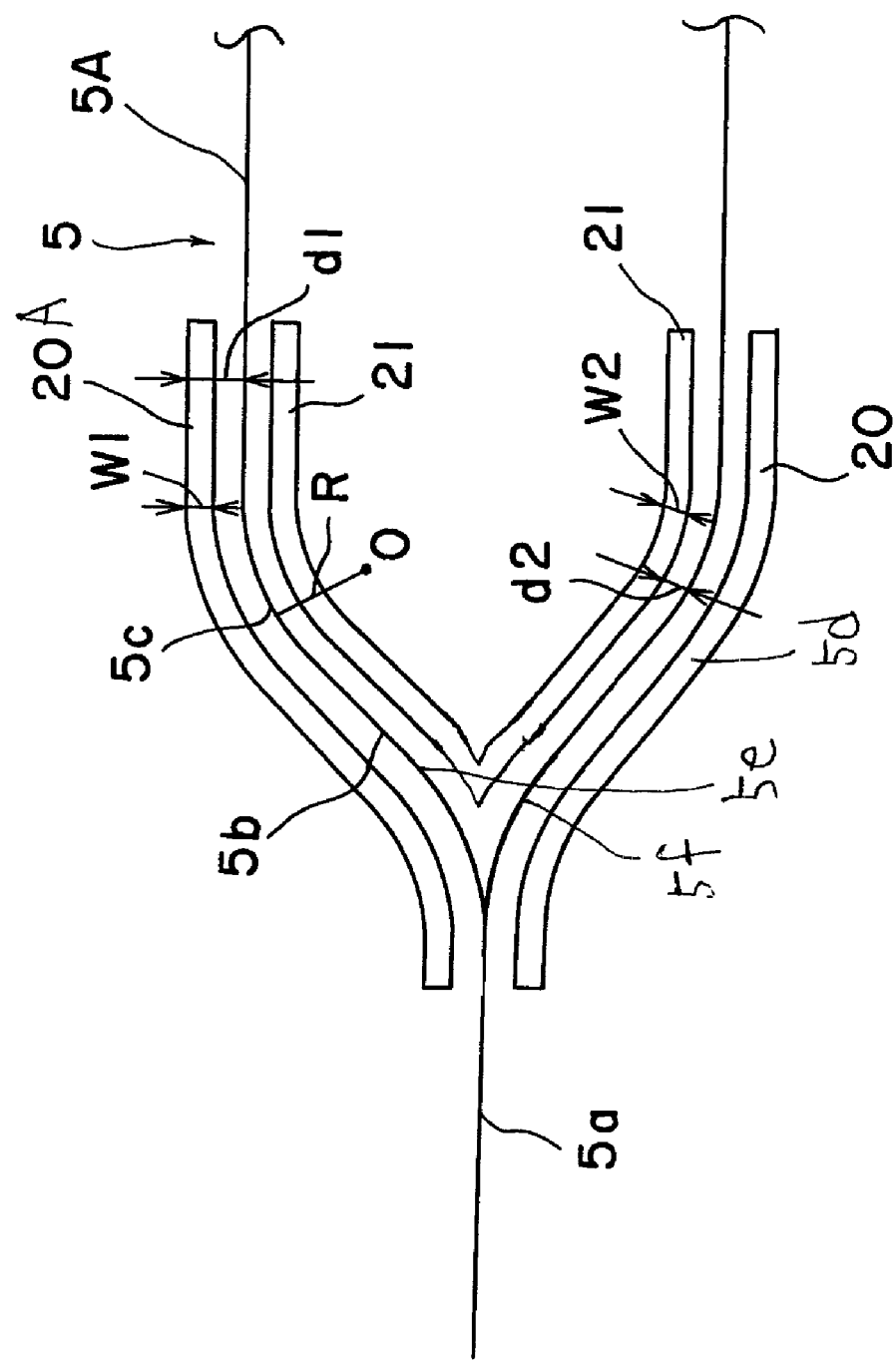
FIG. 5 is a plan view showing a pattern of an optical waveguide where grooves 20 and 21 are formed in the both sides of the optical waveguide.

Further, according to the example shown in FIG. 5, an elongate groove 20A is formed outside (outside of the outer periphery) of the branched part 5b, curved part 5c and the end of the modulating part 5A of the optical waveguide 5. At the same time, an elongate recess 21 is formed inside (inside of the inner periphery) of the branched part 5b, curved part 5c and the end of the modulating part 5A. The radius of curvature "R" of the curved part 5c is 30 mm or smaller. Further, at the same time, also in the curved part 5d, an elongate recess 20A is formed outside of the curved part 5d, an elongate recess 21 is formed inside of the curved part 5d, the radius "R" of curvature of the curved part 5d is made 30 mm or smaller. At the same time, an elongate recess 20A is formed outside with respect to the center of curvature of each of the curved parts 5e and 5f. A recess 21 is formed inside of each of the curved parts 5e and 5f with respect to the center of curvature. The radius "R" of curvature of the curved parts 5e and 5f is made 30 mm or smaller. More preferably, the radii of curvature of the curved parts are made 30 mm or smaller over the whole length of the optical waveguide 5.

The shape or depth of each of the recesses 20, 20A, 21 and 30 is not particularly limited. Although the widths "W", "W1" and "W2" of the recesses 20 and 21 are not particularly limited, they may preferably be 0.2 μm or larger and more preferably be 0.5 μm or larger, for improving the confinement of light in the curved parts 5c, 5d, 5e and 5f, respectively. Further, when distances "d", "d1" and "d2" between the recesses and the centers of the beam propagating the corresponding curved parts 5c, 5d, 5e and 5f, respectively, are too small, the intensity of the light beam propagating the optical waveguide tends to be decreased or the light tends to be scattered. Each of the distances "d", "d1" and "d2" may thus preferably be 1 μm or larger and more preferably be 2 μm or larger. Further, "d", "d1" or "d2" is too large, the effect of confinement of light in the curved part tends to be weak. Each of "d", "d1" and "d2" may preferably be 15 μm or smaller and more preferably be 10 μm or smaller. However, the optimum position of the recess is changed depending on the spot pattern of the optical waveguide. When the spot size is small, it is preferred to form the recess at a position nearer to the curved part. When the spot size is large, it is preferred to form the recess at a position more distant from the curved part.

Figure 12:
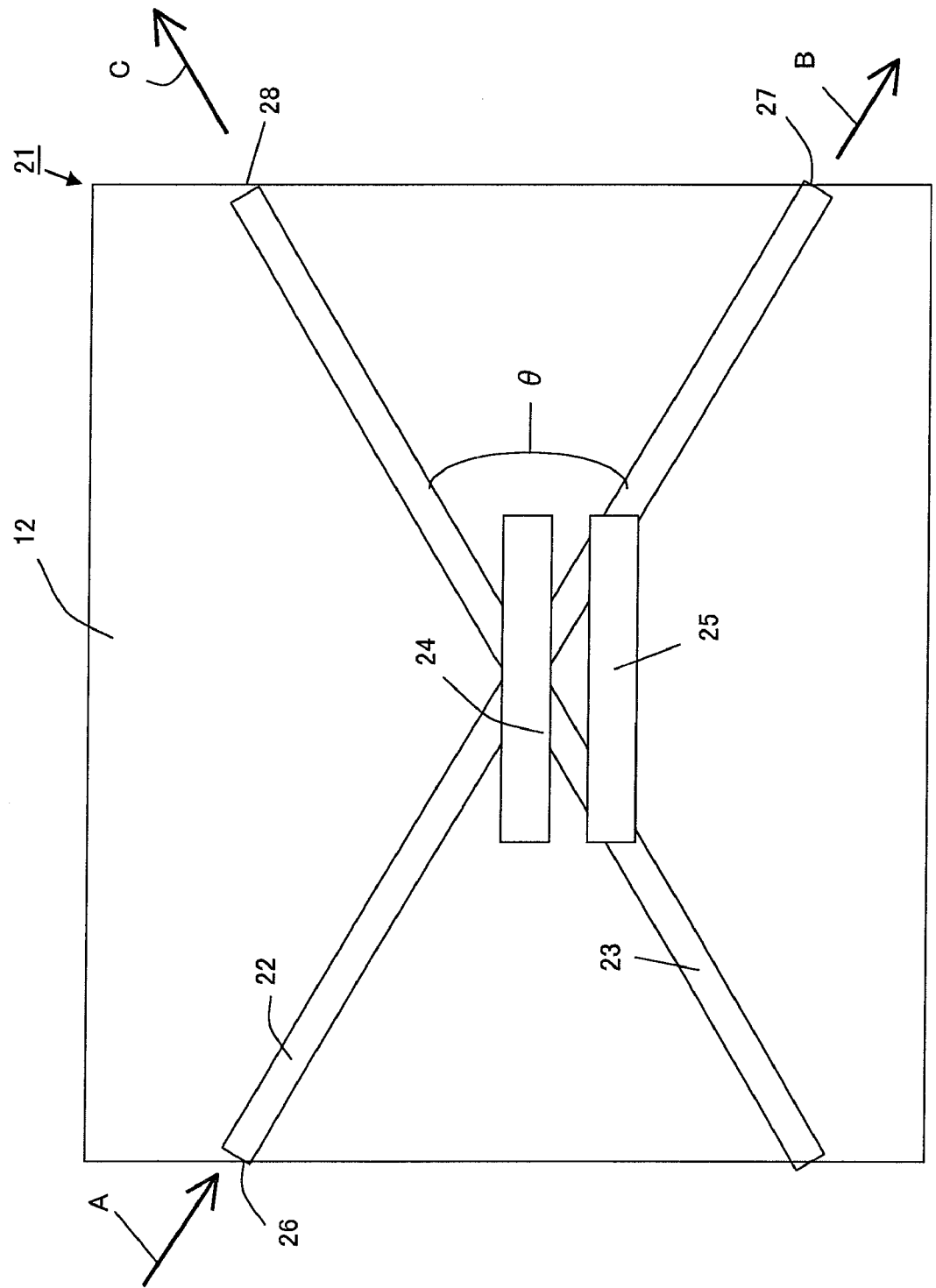
FIG. 12 is a plan view schematically showing an optical switch 21 where the second aspect of the present invention is applicable.

FIG. 12 is a plan view schematically showing an 1×2 optical switch to which the second aspect of the present invention is applicable. The optical switch has an optical waveguide substrate 12 made of X-cut plate of lithium niobate, optical waveguides 22, 23 produced by titanium diffusion formed on the upper face of the substrate 12, and electrodes 24 and 25 positioned on the substrate 12 for applying a voltage required for the switching. When a voltage is not applied on the electrodes 24 and 25, light is incident into the optical waveguide 22 through an input port 26 as an arrow "A", and the inputted light propagates the waveguide 22 and outputted through an output port 27 as an arrow "B". On the other hand, when a voltage is applied on the electrodes, the refractive index of the optical waveguide substrate is lowered in the electrode gap due to the electro-optical effect. The inputted light is thus totally reflected, propagated in the optical waveguide 23 and outputted through an output port 28 as an arrow "C".

As the crossing angle "θ" is smaller, the total reflection can be realized at a smaller change of refractive index, so that the driving voltage can be lowered. The thickness of the substrate 12 is made 30 µm or smaller, according to the present invention, for further lowering the crossing angle "θ".

Further, the present invention may be applied to the position "crossing part" where two waveguide branches are intersected, in an optical integrated device having a plurality of processing units for optical function (for example, optical switch) on a single substrate.

Figure 6:
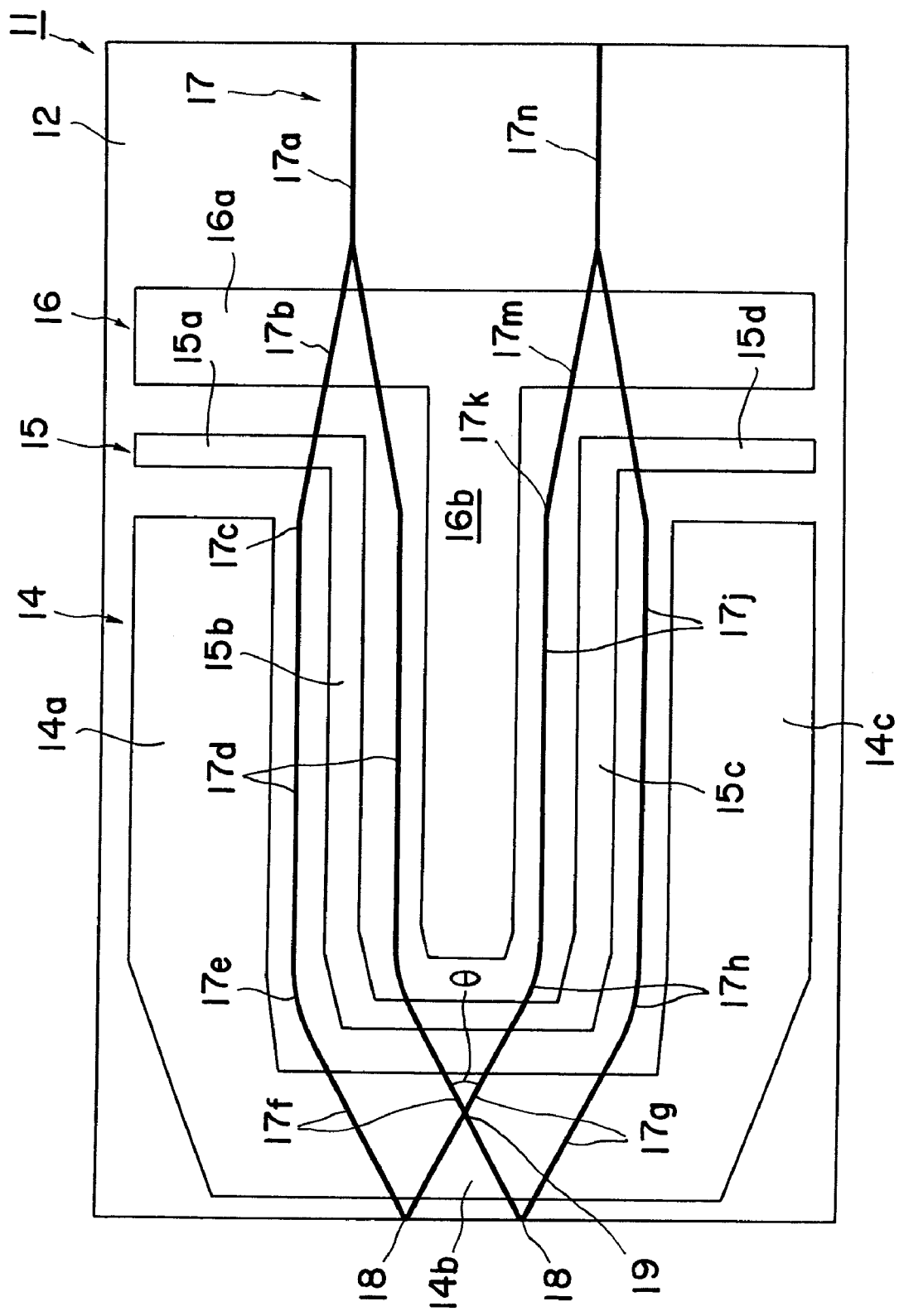
FIG. 6 is a plan view schematically showing a folded type Mach-Zehnder optical waveguide where the first and second aspects of the present invention are applicable.

FIG. 6 is a plan view schematically showing an optical modulator 11 to which the first and second aspects of the present invention are applicable. The optical modulator 11 has an optical waveguide substrate 12, a supporting substrate 31 not shown and an adhesive layer 30 (refer to FIG. 2). The substrate 12 and body 31 both are plate-shaped. The thickness of the substrate 12 (in a region where optical waveguide is formed) is 30 µm or smaller. Predetermined electrodes 14, 15 and 16 are formed on a main face of the substrate 12.

According to the present example, an optical waveguide 17 has a shape where an optical waveguide of Mach-Zehnder type is folded. That is, light is incident into an input part 17a of the optical waveguide 17, divided into two routes at a branched part 17b, propagated in the respective curved parts 17c and inputted into a pair of outward modulating parts 17d. The modulated light is then inputted into the connecting parts 17f through the respective curved parts 17e, and reflected at reflector points 18, respectively, at the edge of the substrate 12. The light reflected at the reflector point 18 is then propagated in the respective connecting parts 17g, and inputted into the respective inward modulating parts 17j through the curved parts 17k, respectively, so that the light is modulated again. The light is then propagated in the curved parts 17k, branched parts 17m, coupled and outputted from an outputting part 17n.

The ground electrode 14 has an outward modulating part 14a, an inward modulating part 14c and a connecting part 14b. Further, the ground electrode 16 has a base part 16a and a modulating part 16b. The signal electrode 15 has input parts 15a, 15d and modulating parts 15b and 15c. The outward modulating part 14a of the ground electrode, the inward modulating part 15b of the signal electrode and the modulating, part 16b of the ground electrode 16 together apply a modulating voltage on the modulating part 17d in a substantially horizontal direction to modulate light propagating in the modulating part 17d. The outward modulating part 14c of the ground electrode, the inward modulating part 15c of the signal electrode and the modulating part 16b of the ground electrode 16 together apply a modulating voltage on a modulating part 17j in a substantially horizontal direction to modulate light propagating in the modulating part 17j.

According to such type of optical modulator, it is indispensable to apply the design that one branched part 17g and the other branched part 17f intersect each other at a crossing part 19.

The first aspect of the present invention may be applied to each of the curved parts 17c, 17e, 17h and 17k. Further, the second aspect of the present invention may be applied to the crossing part 19 of optical waveguide branches. That is, the thickness of the optical waveguide substrate is 30 µm or smaller at least in a region of the optical waveguide.

According to the present example, an X-cut plate of lithium niobate is used as the ferroelectric optical waveguide substrate, and a waveguide produced by titanium diffusion is used as the optical waveguide. It is preferred to strongly confine light in the optical waveguide for reducing the radiation loss by increasing the width or the thickness of a titanium band on a ferroelectric material before the diffusion for each of the curved parts 17c, 17e, 17h and 17k. On the other hand, it is preferred to make the confinement of light in the optical waveguide weaker for improving the cross talk by lowering the width or thickness of a titanium band before the diffusion for the crossing part. In these cases, it is necessary to form a connecting part at which the width or the thickness of the titanium band is changed. In such connecting part, the width or the thickness of the titanium band can be gradually changed to form a taper-shape edge so that an optical waveguide of a low transmission loss can be realized. According to the present example, the width of the titanium band is 8 µm before the diffusion for each of the curved parts 17c, 17e, 17h and 17k, and the width of the titanium band before the diffusion is made 3 µm before the diffusion in the crossing part 19. Further, the length of the tapered part is made 300 µm.

The optical waveguide device of the present invention may be most preferably applied to an optical intensity modulator or optical phase modulator, and may be applied to optical substrate devices such as a second harmonic generating device, an optical switching device, an optical signal processor, a censor device and so on.

EXAMPLES

Example 1

The optical modulator 1 of FIG. 1 was used. Specifically, an X-cut 3 inch wafer (made of LiNbO$_3$ single crystal) was used as a substrate. An optical waveguide 5 of Mach-Zehnder type was formed in the surface area of the wafer by titanium diffusion and photolithography. The size of the optical waveguide 5 may be set at, for example, 10 µm at 1/e$^2$. The CPW electrode pattern was formed by electroplating. The gap between the signal and ground electrodes were made 40 µm, the electrode thickness was made 28 µm and the electrode length was 40 mm. A dummy body for polishing was adhered onto a surface plate for polishing for performing thinning and polishing. The substrate for modulator was adhered thereon with a thermoplastic resin while the electrode face was orientated downwardly. The substrate 4 was thinned to a thickness of 10 µm by means of horizontal polishing and polishing (CMP). The substrate was then adhered onto a plate-shaped supporting body 31, and the substrate was subjected to optical polishing at the connecting part to an optical fiber. The substrate was cut with a dicing saw working machine into chips. An epoxy resin adhesive was used as the adhesive resin for fixing, and the thickness of the resin was made 50 µm. A single-core fiber array holding a 1.5 µm single mode optical fiber was produced and connected to the chip of the traveling wave type optical modulator. After the cores of the optical fiber and waveguide were adjusted, the array and substrate were adhered with each other with a ultraviolet ray-curable resin.

Figure 7:
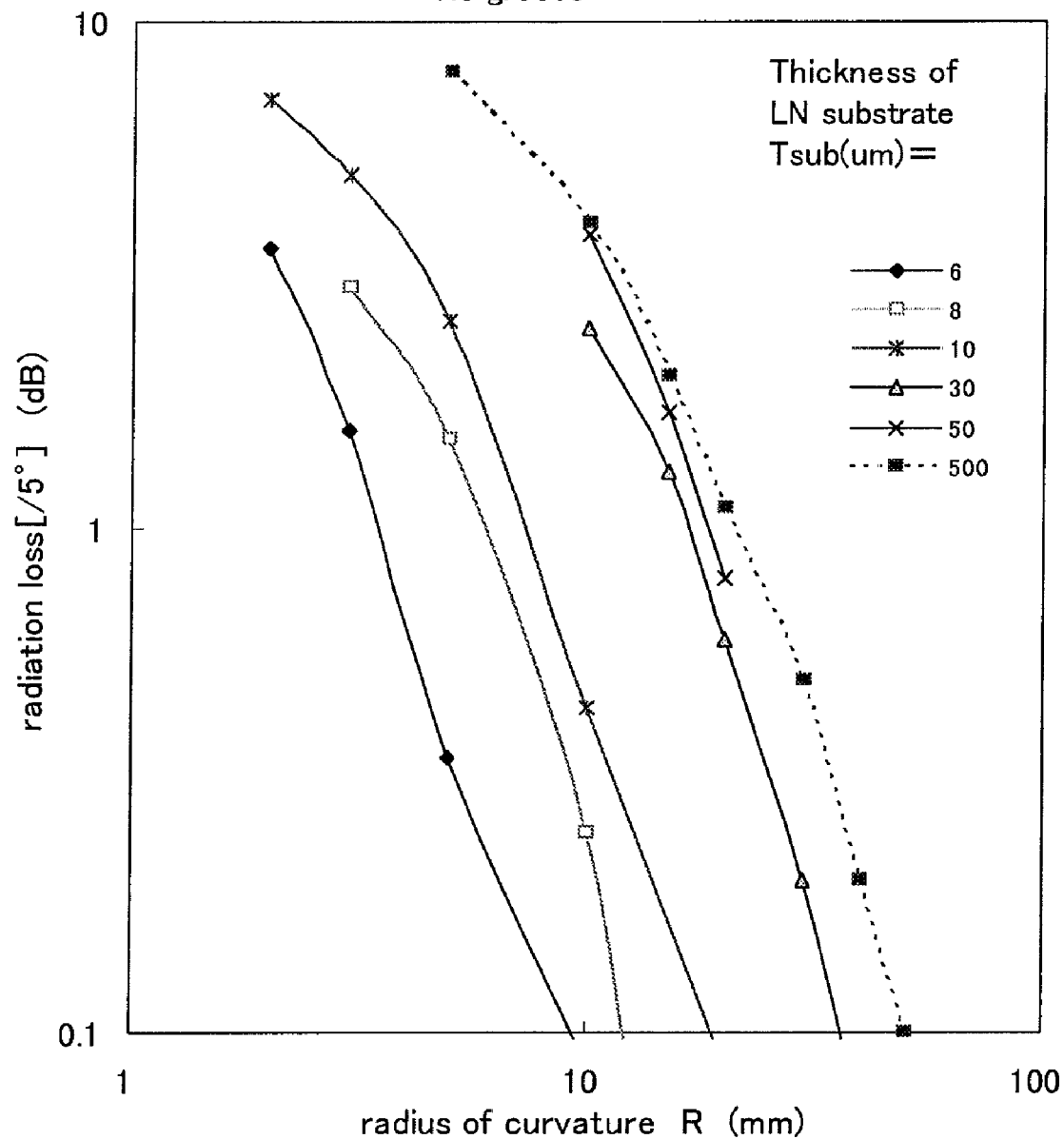
FIG. 7 is a graph showing radiation loss per an angle of curvature of 5° of the curved part.
Figure 8:
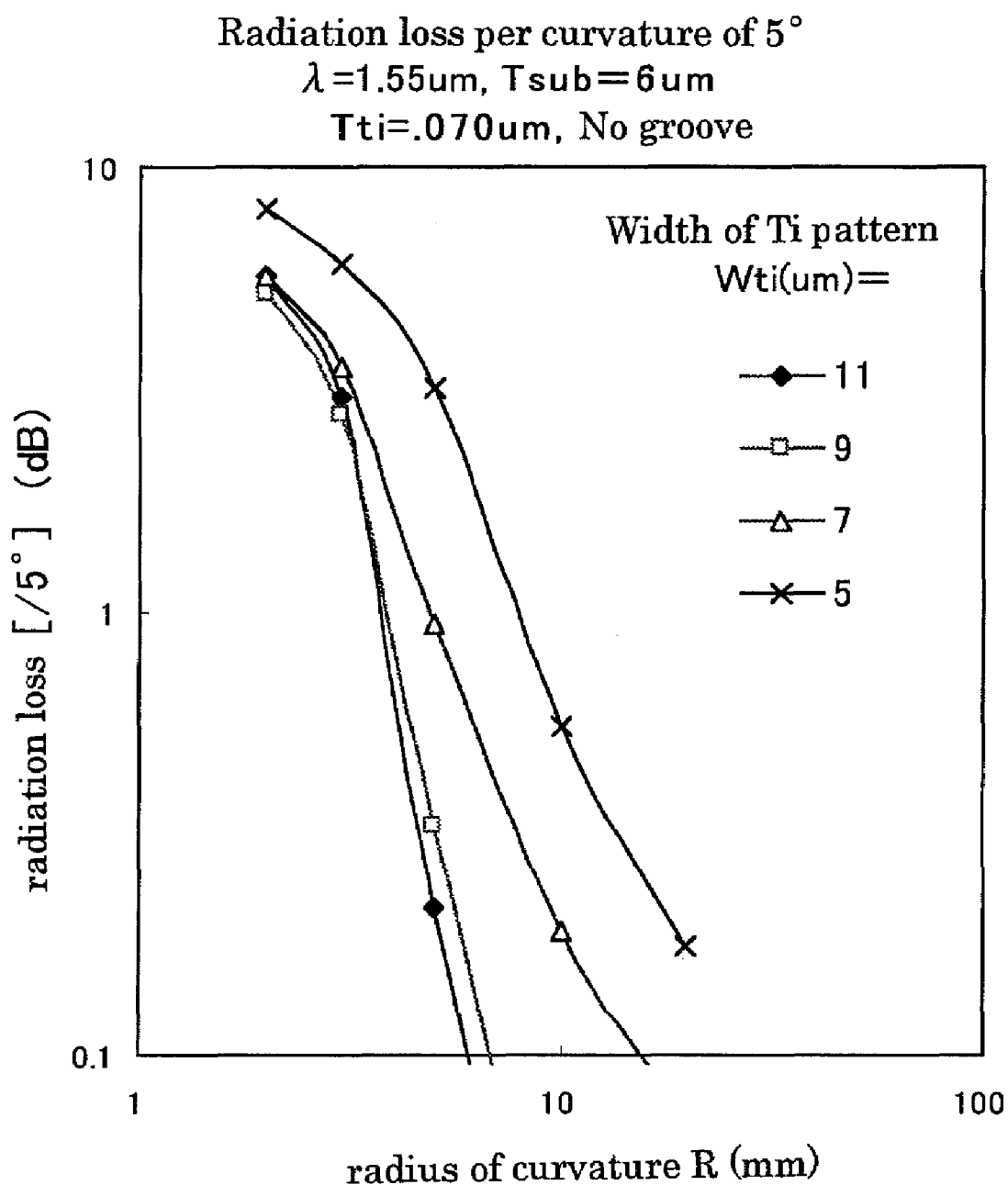
FIG. 8 is a graph showing the insertion loss per an angle of curvature of 5° of the curved part in the case that a titanium width "Wti" is changed.
Figure 9:
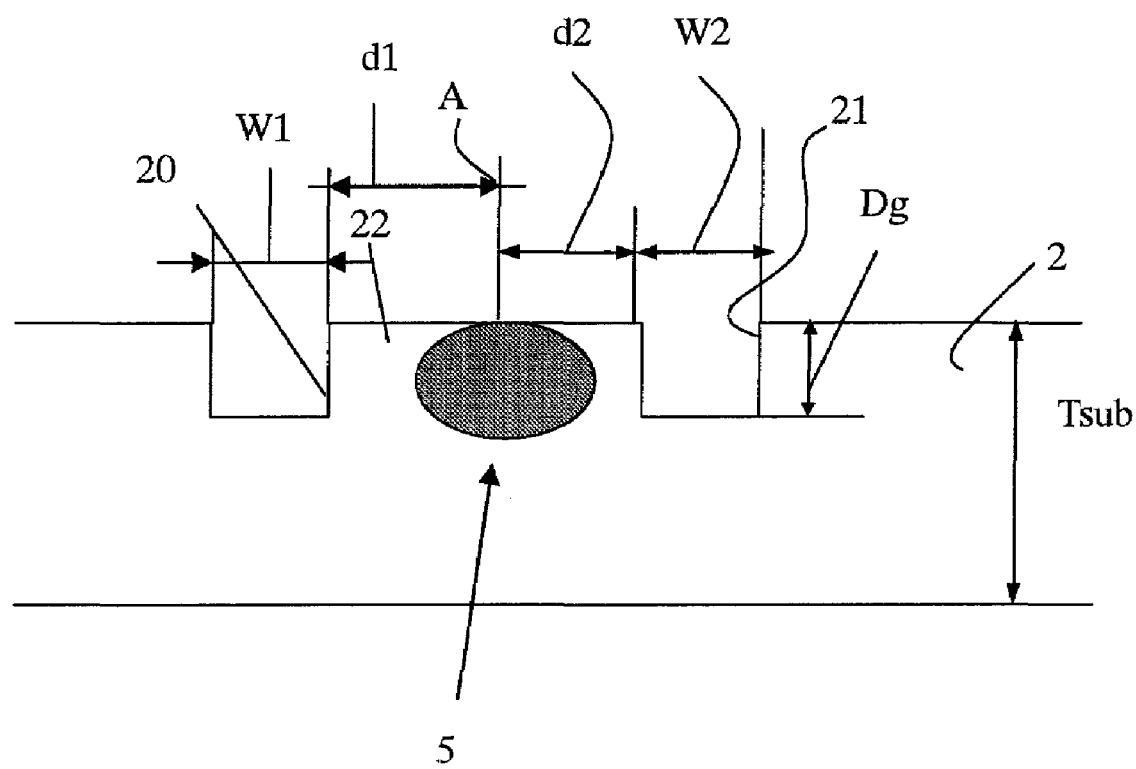
FIG. 9 is a diagram schematically showing dimensions of parts of an optical waveguide.

The thickness of the optical waveguide substrate 3 and each radius "R" of curvature of the curved parts 5c, 5d, 5e and 5f were changed as shown in table 1 and FIG. 7. It was estimated a radiation loss per an angle of curvature of 180° by beam propagation method. The results were shown in table 1. Further, FIG. 8 shows radiation loss per an angle of curvature of 5°. Besides, Tti (thickness of titanium film before the titanium diffusion) was 0.85 µm and Wti (width of titanium film before the titanium diffusion) was 7 µm.

TABLE 1

| Radius of curvature | | Thickness of Optical waveguide Substrate (μm) | | | | | |
|---|---|---|---|---|---|---|---|
| | | 6 | 8 | 10 | 20 | 30 | 50 |
| 2 mm | Radiation loss per angle of curvature of 180° (dB/180°) | 130 | 190 | 250 | 480 | 530 | 600 |
| 3 mm | Radiation loss per angle of curvature of 180° (dB/180°) | 56 | 108 | 180 | 290 | 360 | 450 |
| 5 mm | Radiation loss per angle of curvature of 180° (dB/180°) | 13 | 54 | 93 | 160 | 210 | 270 |
| 10 mm | Radiation loss per angle of curvature of 180° (dB/180°) | 3.2 | 9 | 16 | 61 | 90 | 140 |
| 15 mm | Radiation loss per angle of curvature of 180° (dB/180°) | 1.0 | 1.1 | 6.7 | 24 | 47 | 61 |
| 20 mm | Radiation loss per angle of curvature of 180° (dB/180°) | 0.5 | 0.7 | 3.2 | 12 | 22 | 29 |
| 30 mm | Radiation loss per angle of curvature of 180° (dB/180°) | 0.2 | 0.5 | 1.2 | 3.6 | 7.2 | 10 |
| 40 mm | Radiation loss per angle of curvature of 180° (dB/180°) | 0.1 | 0.4 | 0.5 | 1.73 | 2.5 | 3.6 |

As can be seen from the results, it was proved that the radiation loss can be considerably reduced over a wide range of 2 mm to 30 mm of radius of curvature, by lowering the thickness of the substrate to 30 μm or smaller.

Experiment 2

An optical modulator was fabricated according to the same procedure as the Experiment 1. The radiation loss per an angle of curvature of 5° was measured for each optical modulator. The substrate thickness was 6 μm, Tti (thickness of titanium film before the titanium diffusion) was 0.70 μm and Wti (width of titanium film before the titanium diffusion) was 5 μm, 7 μm, 9 μm or 11 μm. The results were shown in FIG. 8.

As can be seen from FIG. 8, the radiation loss per an angle of curvature of 5° can be considerably reduced, by elevating Wti (width of titanium film before the titanium diffusion) to, especially, 7 μm or larger.

Experiment 3

An optical modulator having the shape of FIGS. 1, 2, 5 or 9 was produced, according to the same procedure as the Experiment 1. The following examples were performed: (1) the groove was not provided, (2) the grooves 20 and 35 were provided and the groove 21 was not provided and (3) both of the grooves 20A and 21 were provided. Each of the widths "W1" and "W2" of the grooves 20, 20A, 21 and 35 was made 5 μm, and the distances "d1" and "d2" between the grooves 20, 21 and the beam center of the optical waveguide were made 4 μm, respectively. The depth "Dg" of each of the grooves 20, 20A, 21 and 35 was made 2 μm. The thickness of the optical waveguide substrate 3 and the radius "R" of curvature of each of the curved parts 5c to 5f were changed as shown in table 2. The radiation loss per an angle of curvature of 180° was estimated by means of beam propagation method. The results were shown in table 2.

TABLE 2

| | | Thickness of LN substrate: 8 μm Radius of Curvature 2 mm | Thickness of LN substrate: 8 μm Radius of Curvature: 5 mm |
|---|---|---|---|
| No groove | Radiation loss per angle of curvature of 180° (dB/180°) | 190 | 54 |
| Grooves 20, 35 (Outside of Waveguide) | Radiation loss per angle of curvature of 180° (dB/180°) | 103 | 16 |
| Grooves 20A and 21 (both sides of Waveguide) | Radiation loss per angle of curvature of 180° (dB/180°) | 1.3 | 1.3 |

According to the results, it is proved that the radiation loss can be considerably reduced by providing the grooves 20 and 35 and by lowering the thickness of the substrate to 30 μm or smaller. It is also proved that the radiation loss can be further reduced by providing the grooves 21 and 20A.

Experiment 4

Figure 10:
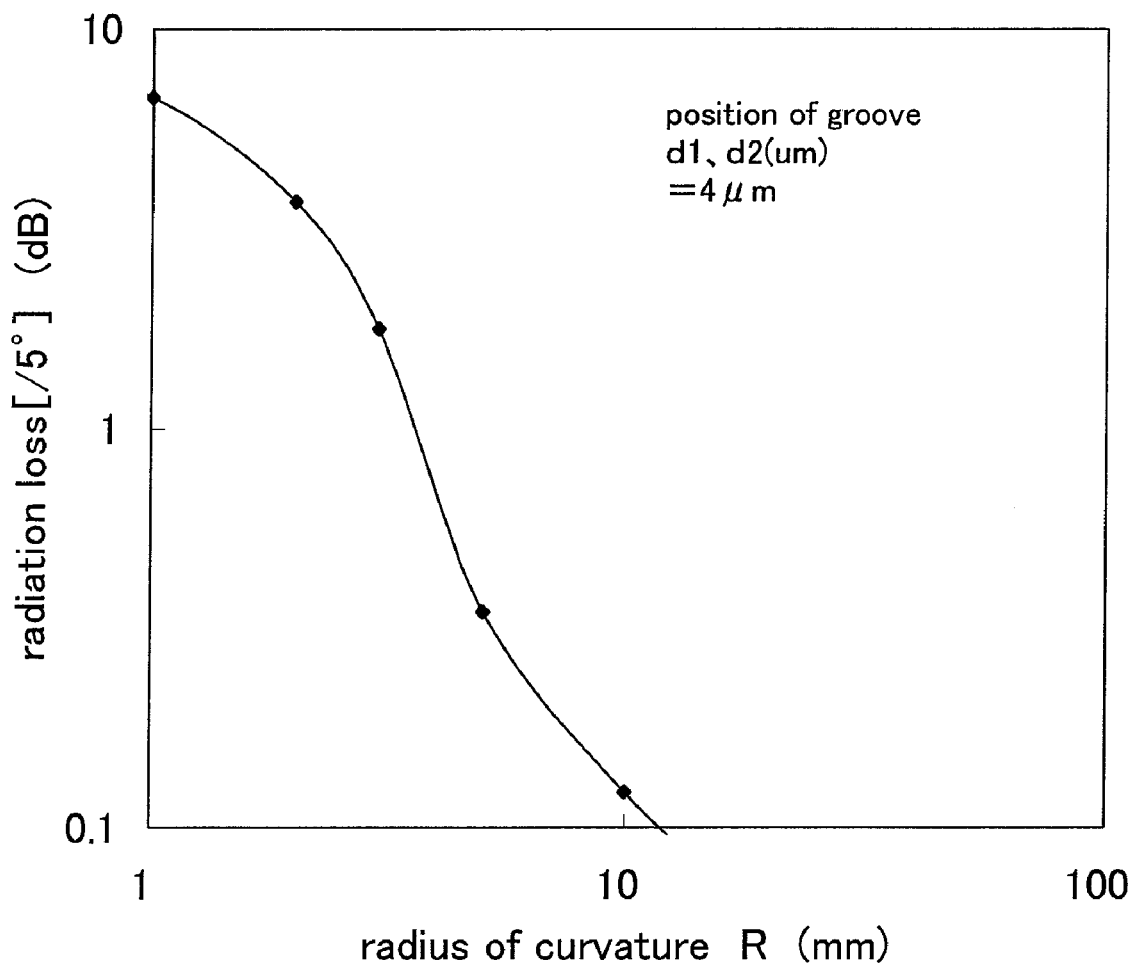
FIG. 10 is a graph showing radiation loss per an angle of curvature of 5° of curved part in the case that the grooves 20 and 21 are formed.

An optical modulator was fabricated according to the same procedure as the Experiment 3. The elongate grooves 20 and 21 were provided on the outer and inner sides of the curved part, respectively. The widths "W1" and "W2" of the grooves 20 and 21 were made 5 μm, respectively, and the distances "d1" and "d2" between the grooves 20 and 21 and the beam center of the optical waveguide were made 4 μm, respectively. The depth "Dg" of each of the grooves 20 and 21 was made 2 μm. The thickness "Tsub" of the optical waveguide substrate 3 was made 6 μm. The radius "R" of curvature of the curved part 5c was changed as shown in FIG. 10 and the radiation loss per an angle of curvature of 5° was estimated by means of beam propagation method. The results were shown in FIG. 10.

As can be seen from FIG. 10, the radiation loss in the curved part could be reduced, by lowering the thickness "Tsub" of the substrate to 6 μm or smaller, even when the depth "Dg" of the groove is as small as 2 μm.

Experiment 5

Figure 11:
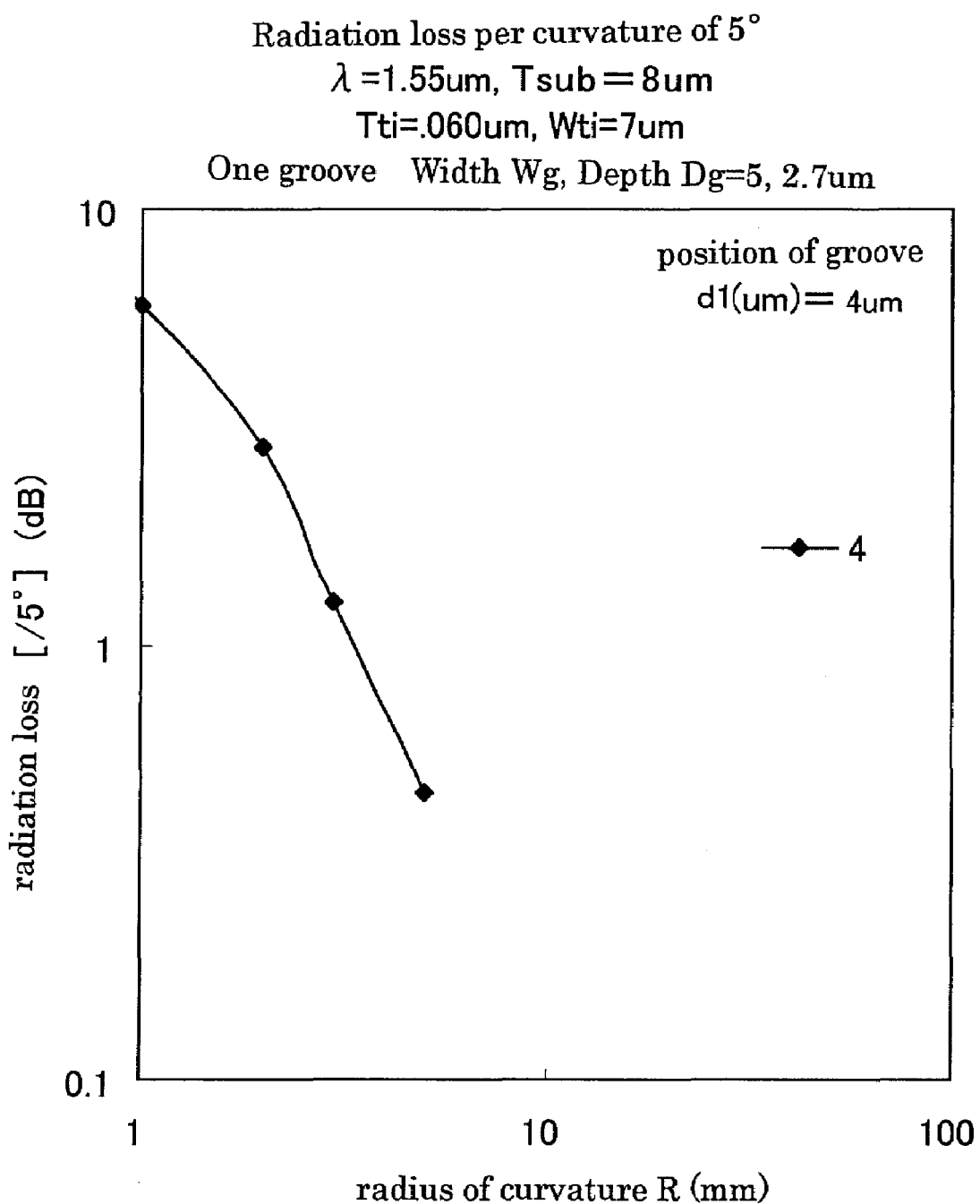
FIG. 11 is a graph showing radiation loss per an angle of curvature of 5° of curved part in the case that the groove 20 is formed.

An optical modulator was produced according to the same procedure as the experiment 4, except that the grooves 20 and 35 were formed in the outside of the curved part and the groove 21 was not formed in the inside of the curved part. The width "W1" of each of the grooves 20 and 35 was made 5 μm, and the distance "d1" between each of the grooves 20 and 25 and the beam center of the optical waveguide was made 4 μm. The depth "Dg" of the groove 20 was made 2.7 μm. The thickness "Tsub" of the optical waveguide substrate 3 was made 8 μm. The radius "R" of curvature of the curved part 5c was changed as shown in FIG. 11, and the radiation loss per an angle of curvature of 5° was estimated by means of beam propagation method. The results were shown in FIG. 10.

As can be seen from FIG. 11, the radiation loss in the curved part could be reduced by providing the grooves 20 and 35 in only one side of the curved part.

Experiment 6

An optical modulator having the shape shown in FIGS. 2 and 6 was produced according to the same procedure as the Experiment 1. According to the present example, however, the radius of curvature of each of the curved parts was made 15 mm. The thickness of the optical waveguide substrate 3 and the whole crossing angle "θ" were changed as shown in table 3, and the insertion loss and cross talk were estimated by means of beam propagation method. The results were shown in table 3.

TABLE 3

| Whole Crossing Angle (°) | | Thickness of substrate | | | | | | |
|---|---|---|---|---|---|---|---|---|
| | | 6 | 8 | 10 | 20 | 30 | 50 | 500 |
| 4 | Cross talk | 19 | 17 | 13 | 10 | 9.0 | 8.0 | 8.0 |
| | Insertion Loss | 0.5 | 0.6 | 1.3 | 3.2 | 5.1 | 8.0 | 8.0 |
| 6 | Cross talk | 32 | 31 | 29 | 23 | 21 | 19 | 19 |
| | Insertion Loss | 0.3 | 0.5 | 0.7 | 1.2 | 1.6 | 2.1 | 2.1 |
| 8 | Cross talk | 50 | 49 | 44 | 37 | 34 | 31 | 31 |
| | Insertion Loss | 0.2 | 0.4 | 0.4 | 0.6 | 0.8 | 1.0 | 1.0 |
| 10 | Cross talk | 63 | 57 | 54 | 50 | 47 | 45 | 45 |
| | Insertion Loss | 0.3 | 0.3 | 0.3 | 0.5 | 0.6 | 0.8 | 0.8 |
| 20 | Cross talk | 130 | 97 | 94 | 93 | 92 | 90 | 90 |
| | Insertion Loss | 0.3 | 0.3 | 0.3 | 0.5 | 0.6 | 0.7 | 0.7 |

As can be seen from the results, it was proved that the cross talk and insertion loss could be considerably reduced over a wide crossing angle "θ" of curvature, when the thickness of the substrate was made 30 μm or smaller.

The present invention has been explained referring to the preferred embodiments, however, the present invention is not limited to the illustrated embodiments which are given by way of examples only, and may be carried out in various modes without departing from the scope of the invention.

The invention claimed is:

1. An optical waveguide device comprising a ferroelectric optical waveguide substrate and an optical waveguide formed in or on said optical waveguide substrate, wherein said optical waveguide substrate has a thickness of 30 μm or smaller at least in a region where said optical waveguide is formed, said optical waveguide comprises a curved part having a radius of curvature of 30 mm or smaller, and said device further comprises a recess formed in said optical waveguide substrate on the same side as said optical waveguide and outwardly of said curved part with respect to the center of curvature of said curved part.

2. The optical waveguide device of claim 1, wherein said optical waveguide is formed by doping of an impurity.

3. The optical waveguide device of claim 2, further comprising an additional recess formed inwardly of said curved part with respect to the center of curvature of said curved part.

4. The optical waveguide device of claim 1, further comprising a modulating electrode applying a voltage for modulating light propagating in said optical waveguide.

5. An optical waveguide device comprising a ferroelectric optical waveguide substrate and an optical waveguide formed in or on said optical waveguide substrate, wherein said optical waveguide substrate has a constant thickness of 30 μm or smaller across an entire width of said optical waveguide substrate, and wherein said optical waveguide comprises a crossing part.

6. The optical waveguide device of claim 5, wherein said optical waveguide is formed by doping of an impurity.

7. The optical waveguide device of claim 5, further comprising a modulating electrode applying a voltage for modulating light propagating in said optical waveguide.

8. The optical waveguide device of claim 5, wherein said crossing part has a whole crossing angle θ of 20° or smaller.

9. The optical waveguide device of claim 5, wherein said thickness of said optical waveguide substrate is 20 μm or smaller.

10. The optical waveguide device of claim 5, further comprising a supporting body and an adhesive layer joining said optical waveguide substrate and said supporting body.

* * * * *